US007260190B2

(12) United States Patent
Fellenstein et al.

(10) Patent No.: US 7,260,190 B2
(45) Date of Patent: Aug. 21, 2007

(54) SYSTEM AND METHOD FOR MANAGING VOICEMAILS USING METADATA

(75) Inventors: Craig William Fellenstein, Brookfield, CT (US); Carl Phillip Gusler, Austin, TX (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/256,108

(22) Filed: Sep. 26, 2002

(65) Prior Publication Data

US 2004/0062367 A1    Apr. 1, 2004

(51) Int. Cl.
*H04M 1/64* (2006.01)
(52) U.S. Cl. .............................. 379/88.24; 379/88.08; 379/88.25
(58) Field of Classification Search ...................... None
See application file for complete search history.

(56) References Cited

U.S. PATENT DOCUMENTS

| 5,943,402 | A | * | 8/1999 | Hamel et al. ............ 379/88.26 |
| 6,055,495 | A | | 4/2000 | Tucker et al. ............... 704/210 |
| 6,181,780 | B1 | | 1/2001 | Finnigan .................... 379/67.1 |
| 6,341,160 | B2 | | 1/2002 | Tverskoy et al. ......... 379/88.13 |
| 6,449,342 | B1 | * | 9/2002 | Johanson .................. 379/88.11 |
| 6,522,727 | B1 | * | 2/2003 | Jones ....................... 379/88.23 |
| 6,590,965 | B1 | * | 7/2003 | Poole et al. .............. 379/88.19 |
| 2002/0110226 | A1 | * | 8/2002 | Kovales et al. ........... 379/88.17 |
| 2002/0147592 | A1 | * | 10/2002 | Wilmot et al. ............ 704/270.1 |
| 2003/0128820 | A1 | * | 7/2003 | Hirschberg et al. ...... 379/88.14 |
| 2005/0053207 | A1 | * | 3/2005 | Claudatos et al. ........ 379/88.22 |

FOREIGN PATENT DOCUMENTS

EP          1109390 A2 *   6/2001

* cited by examiner

*Primary Examiner*—Fan Tsang
*Assistant Examiner*—Joseph T Phan
(74) *Attorney, Agent, or Firm*—VanLeeuwen & VanLeeuwen; David A. Mims, Jr.

(57) ABSTRACT

A system and method for managing voicemails using metadata is presented. The metadata includes an audible introduction which a user records and associates the audible introduction to a voicemail. The user is also able to associate other types of metadata to a voicemail, such as a description data flag, a reminder flag, and a retention flag. Once the user associates the metadata with a voicemail, the user is able to retrieve the audible introduction and the voicemail in a sequential manner or through search criteria. The user is able to customize metadata based upon the user's requirements.

9 Claims, 9 Drawing Sheets

SYSTEM AND METHOD FOR MANAGING VOICEMAILS USING METADATA

BACKGROUND OF THE INVENTION

1. Technical Field

The present invention relates in general to a system and method for managing voicemails using metadata. More particularly, the present invention relates to a system and method for associating metadata, which includes an audible introduction, to a voicemail and managing the voicemail using the metadata.

2. Description of the Related Art

Voicemail has evolved into a very important technology for people at work and at home to communicate with each other. People are becoming more mobile, and rely on their voicemail system to store messages from callers. Today, almost every phone number has an associated voicemail system for a caller to leave a message. If a caller calls a phone number without voicemail capability, the caller may become irritated since the caller will have to re-call the number at a later time.

When a user receives a voicemail, the voicemail system typically allows the user to delete the voicemail or save the voicemail. Some inter-company voicemail systems allow the user to respond to the voicemail if the caller is calling from an inter-company phone number. The user may save a voicemail for a variety of reasons. First, the user may wish to think about his response to the voicemail message at a more convenient time. Second, the voicemail may include information in which the user wishes to write down or store in a computer file. Third, the user may wish to save the voicemail for future reference. Since most voicemails are remotely accessible, the user may use his voicemail system to store important information since the user is able to access the information from most telephones.

A challenge found with existing voicemail systems is their ability to provide sufficient saved message management. A user may have over fifty saved messages in a single month. Existing voicemail systems typically store voicemail messages based upon when the voicemail messages were received. The user may have to listen to each message in order to retrieve the message of interest. If the user wishes to continue to save a particular message for future reference, the particular message stays in the saved message box and the user sorts through the saved message each time the user is searching for a different message.

Additionally, some voicemail messages are exhaustive, lasting many minutes. The user may wish to retrieve information that is at the end of a three minute voicemail message. Each time the user wishes to retrieve the information, the user listens to the entire message in order to retrieve the information.

Furthermore, a user may wish to index voicemails based upon the content of the voicemail. A user may be working on three projects and wish to index each voicemail based upon which project it pertains. A challenge found with existing voicemails is their inability to retrieve voicemails based upon a set of criteria.

What is needed, therefore, is a way for a user to add information to a voicemail message which provides improved voicemail management.

SUMMARY

It has been discovered that the aforementioned challenges are resolved by associating metadata to a voicemail message and using the metadata to manage the voicemail message. A user listens to a voicemail message and associates an audible introduction to the voicemail message. The user is also able to associate other types of metadata to the voicemail message in order to manage voicemail retrieval using a particular search criterion.

A caller leaves a message for the user on the user's voicemail system. The user accesses his voicemail system, listens to the voicemail message, and determines whether he wishes to associate an audible introduction with the voicemail message. For example, the user may have stepped out of a meeting to check his voicemail and may not have time at the moment to respond to the voicemail message. Another example is that the message may be lengthy and the user may wish to add an audible introduction which summarizes the voicemail message.

If the user wishes to associate an audible introduction with the voicemail message, the user sends a request to the voicemail system to record an audible introduction. The user may also associate other types of metadata information to the voicemail message, such as a description data flag, a reminder flag, and a retention flag. The description data flag may be used to index the voicemail message. For example, the description data flag may be used to group together voicemail messages that pertain to a particular project. The reminder flag may be used to notify the user to re-listen to the corresponding voicemail message. For example, the voicemail message may include driving directions to a meeting in one week. The user may set a reminder flag to have the corresponding voicemail played one day before the meeting to remind the user of the driving directions. The retention flag may be used to instruct the voicemail system to delete a corresponding voicemail message and it's audible introduction at a future date. For example, the user may receive a message that includes information he may use within the next few days. In this example, the user may set a retention flag to have the voicemail deleted in two weeks in order to minimize the amount of saved messages he retains. Once the user associates metadata information to the voicemail message, the voicemail system stores the metadata information in a non-volatile storage area.

When the user wishes to review voicemail messages, the user sends a request to the voicemail system which includes a request to receive an audible introduction associated with a voicemail mail message. The request may also include metadata search criteria that instructs the voicemail system to retrieve audible introductions that are associated with the search criteria. For example, the user may wish to retrieve audible introductions for voicemail messages that pertain to a particular project. Another example is that the user may wish to listen to each audible introduction associated with each saved message in a sequential order (i.e. the order in which each audible introduction was saved).

The voicemail manager compares saved metadata information with the user's request, and retrieves one or more audible introductions that match the user's request. The user listens to one of the audible introductions and determines whether he wishes to listen to the voicemail message associated with audible introduction.

If the user does not wish to listen to the voicemail message associated with the audible introduction, the user may send a second request with different metadata search criteria to the voicemail system. On the other hand, if the user wishes to listen to the voicemail associated with the audible introduction, the user instructs the voicemail system to retrieve the associated voicemail message. The user listens to the voicemail message and is able to change or add metadata information associated with the voicemail message.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
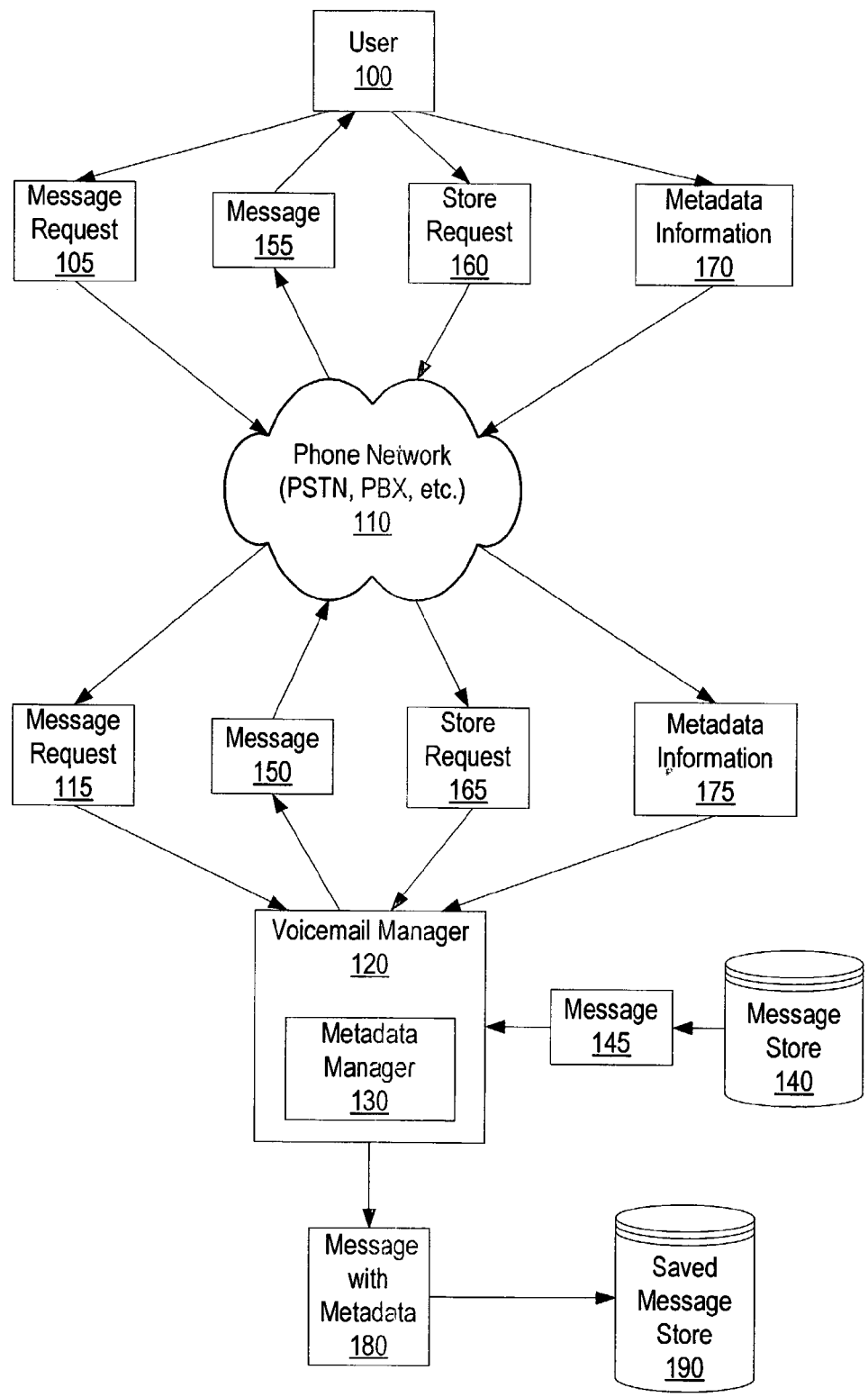
FIG. 1 is a diagram showing a user accessing voicemail messages and saving the voicemail messages with corresponding metadata.

FIG. 1 is a diagram showing a user accessing voicemail messages and saving the voicemail messages with corresponding metadata. A caller leaves a message for user 100 and voicemail manager 120 stores the caller's message in message store 140. Message store 140 may be stored on a non-volatile storage area, such as a computer hard drive. User 100 accesses his voicemail messages by sending message request 105 to voicemail manager 120 through phone network 110. Phone network 110 may be an electronic network that handles telephone calls. For example, user 100 may be accessing his voicemail from his office phone in which case phone network 110 may be a Private Branch Exchange (PBX). Another example is user 100 may be accessing his voicemail using a telephone external to his office building in which case phone network 110 may be a Public Switch Telephone Network (PSTN).

Voicemail manager 120 receives message request 115, and retrieves user 100's message 145 from message store 140. Voicemail manager 120 sends message 150 to user 100 through phone network 110. User 100 listens to message 155, and determines whether he wishes to associate an audible introduction with the voicemail message. For example, user 100 may have stepped out of a meeting to check his voicemail and may not have time at the moment to respond to the voicemail message. Another example is that message 155 may be lengthy and user 100 may wish to add an audible introduction which summarizes the voicemail message.

Voicemail manager includes metadata manager 130 which manages the audible introductions as well as other types of metadata information. Other types of metadata information user 100 may associate to the voicemail message are a description data flag, a reminder flag, and a retention flag. The description data flag may be used to index the voicemail message. For example, the description data flag may be used to group together voicemail messages that pertain to a particular project. The reminder flag may be used to notify user 100 to re-listen to the corresponding voicemail message. For example, the voicemail message may include driving directions to a meeting in one week. User 100 may set a reminder flag to have the corresponding voicemail played one day before the meeting to remind the user of the driving directions. The retention flag may be used to instruct metadata manager 130 to delete a corresponding voicemail message and it's audible introduction at a future date. For example, user 100 may receive a message that includes information he may use within the next few days. In this example, user 100 may set a retention flag to have the voicemail deleted in two weeks in order to minimize the amount of saved messages he retains.

If user 100 wishes to associate an audible introduction with the voicemail message, user 100 sends store request 160 to voicemail manager 130 through phone network 110. Store request 160 informs voicemail manager that user 100 wishes to store the corresponding message and associate metadata with the voicemail message. Voicemail manager 120 receives store request 165 and prepares to receive metadata information.

User 100 sends metadata information 170 to voicemail manager 120 through phone network 110. Metadata information 175 includes the audible introduction and other metadata information that user 100 wishes to associate with the voicemail. Voicemail manager 120 receives metadata information 175 and passes it to metadata manager 130 to process. Metadata information 175 may be in the format of DTMF tones or a speech pattern. For example, user 100 may have previously configured metadata manager 130 to recognize particular DTMF tones and correspond the tones to a particular description data flag. In this example, user 100 may configure "1" on a touch tone phone to correspond to his primary project, and configure "2" on a touch tone phone to correspond to his secondary project.

Metadata manager 130 processes metadata information 175 and stores voicemail message with metadata 180 in saved message store 190. Voicemail message with metadata 180 includes the original voicemail message, the audible introduction, and may include other types of metadata. In one embodiment, metadata manager 130 may store the audible introduction and the other metadata in a separate location than the original voicemail message and build an association table to track which voicemail message is associated with which audible introduction and other metadata. Saved message store 190 may be stored on a non-volatile storage area, such as a computer hard drive. User 100 may access the voicemail message at a later time by first listening to the audible introduction and/or searching the metadata (see FIG. 2 and corresponding text for further details regarding voicemail retrieval).

Figure 2:
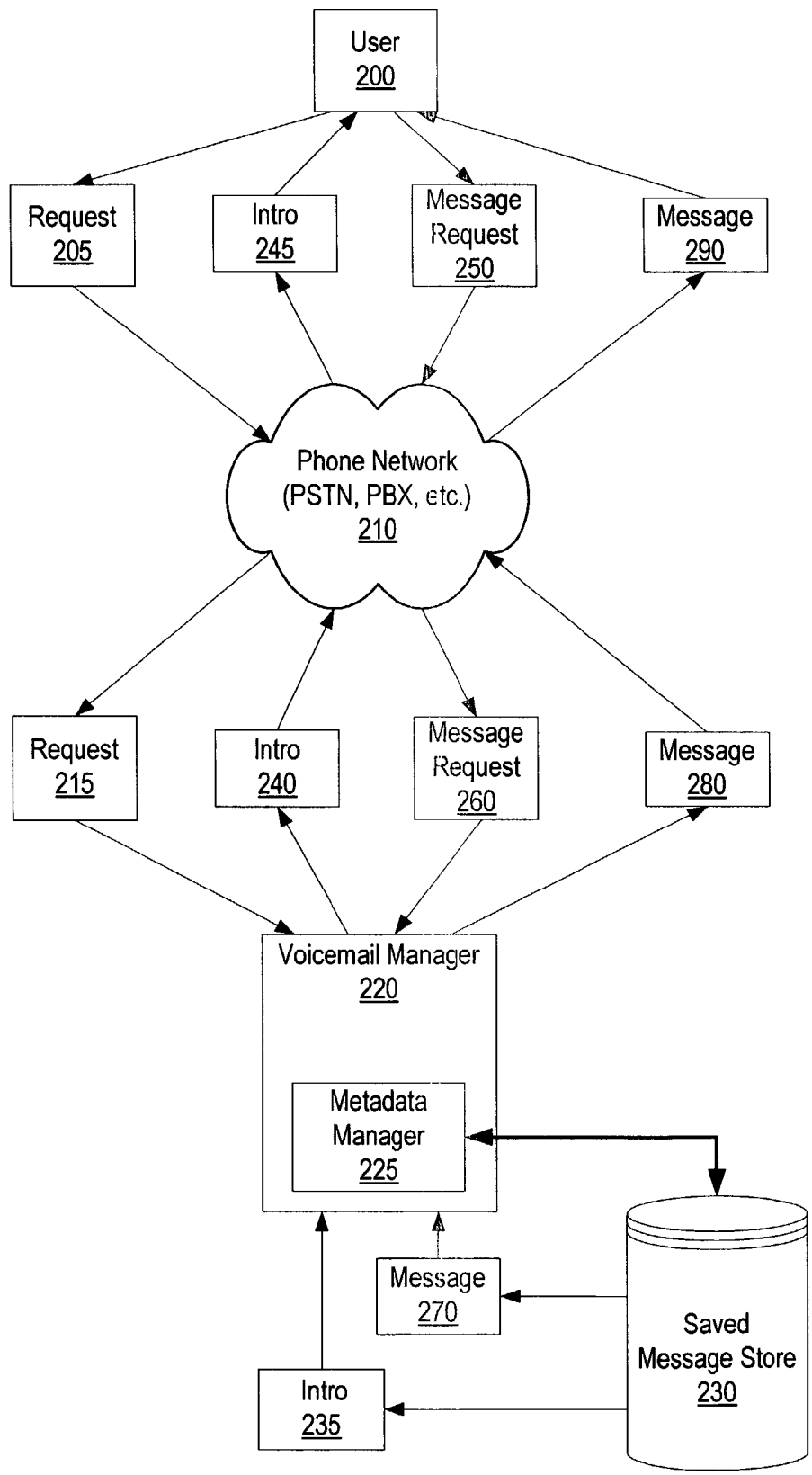
FIG. 2 is a diagram showing a user listening to audible introductions corresponding to voicemail messages and retrieving a saved message corresponding to a selected audible introduction.

FIG. 2 is a diagram showing a user listening to audible introductions corresponding to voicemail messages and retrieving a saved message corresponding to a selected audible introduction. User 200 has saved messages in saved message store 230. The saved messages include audible introductions and other metadata that user 200 previously associated with the voicemail messages (see FIG. 1 and corresponding text for further details regarding associating metadata with voicemails).

User 200 sends request 205 to voicemail manager 220 through phone network 210. Phone network 210 may be an electronic network that handles telephone calls. For example, user 200 may be accessing his voicemail from his office phone in which case phone network 210 may be a Private Branch Exchange (PBX). Another example is user 200 may be accessing his voicemail using a telephone external to his office building in which case phone network 210 may be a Public Switch Telephone Network (PSTN). Request 205 includes a request to receive an audible introduction associated with a voicemail mail message. Request 205 may also include metadata search criteria that instructs metadata manager 225 to retrieve audible introductions that are associated with the search criteria. For example, user 200 may wish to retrieve audible introductions for voicemail messages that pertain to a particular project. Another example is that user 200 may wish to listen to each audible introduction associated with each saved message in the order in which each audible introduction was saved.

Voicemail manager 220 receives request 215 and passes the request to metadata manager 225 to process. Metadata manager 225 searches saved message store 230 for metadata that match user 200's request. Metadata manager 225 locates an audible introduction that matches user 200's criteria, and retrieves audible introduction 235 from saved message store 230. Voicemail manager 220 sends audible introduction 240 to user 200 through phone network 210. User 200 listens to audible introduction 245 and determines whether he wishes to listen to the voicemail message associated with audible introduction 245.

If user 200 does not wish to listen to the voicemail message associated with audible introduction 245, user 200 may send a second request 205 with different metadata search criteria to voicemail manager 220. On the other hand, if user 200 wishes to listen to the voicemail associated with audible introduction 245, user 200 sends message request 250 to voicemail manager 220 through phone network 210. Message request 250 instructs voicemail manager 220 to provide the voicemail message corresponding to audible introduction 245.

Voicemail manager 220 receives message request 260 and passes the message request to metadata manager 225. Metadata manager retrieves message 270 from saved message store 230. Message 270 is the message which is associated with audible introduction 235. Voicemail manager 220 sends message 280 to user 200 through phone network 210. User 200 listens to message 290 and may perform basic voicemail activities such as deleting the message or forwarding the message. User 200 may also decide to change or add metadata information associated with the voicemail message in which case user 200 proceeds through a sequence of steps to add or modify metadata (see FIGS. 3, 4, 8, and corresponding text for further details regarding metadata association).

Figure 3:
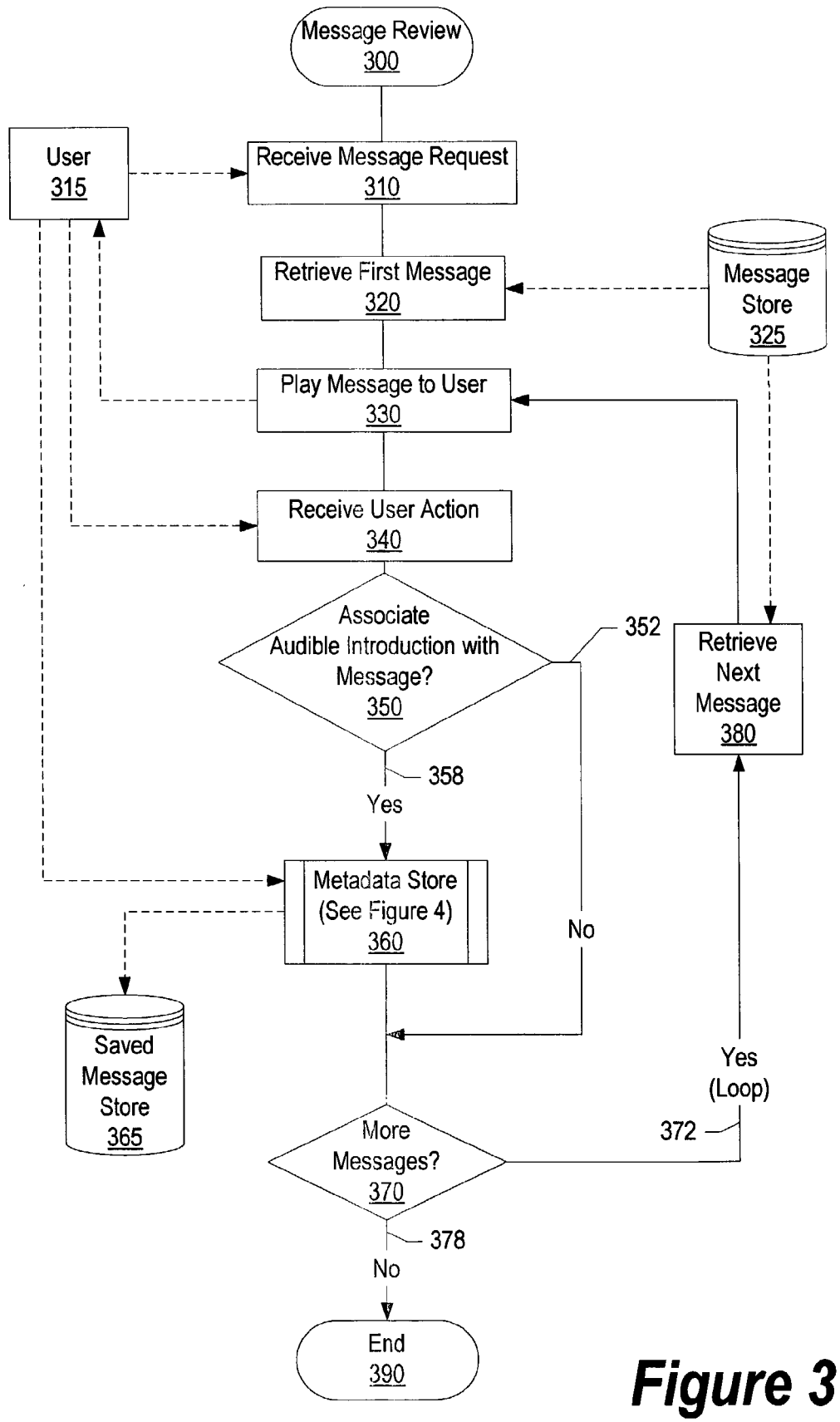
FIG. 3 is a flowchart showing steps taken in reviewing voicemail messages and determining whether to associate an audible introduction with the voicemail message.

FIG. 3 is a flowchart showing steps taken in reviewing voicemail messages and determining whether to associate an audible introduction with the voicemail message. Message review processing commences at 300, whereupon processing receives a request from user 315 which instructs processing to provide a voicemail message (step 310). Processing retrieves a first voicemail message from message store 325 at step 320. The first voicemail message may be a recent message from a caller that user 315 has not yet heard. Processing sends the first voicemail message to user 315 at step 330.

User 315 listens to the first voicemail message and decides a course of action. User 315 may delete the voicemail message, forward the voicemail message to a colleague, save the voicemail message, or save the voicemail message and associate an audible introduction with the voicemail message. For example, user 315 may have stepped out from a meeting and wish to add an audible introduction to the voicemail message which informs user 315 as to the content of the voicemail message (see FIG. 5 and corresponding text regarding message retrieval).

Processing receives user 315's action request at step 340. A determination is made as to whether user 315 wishes to associate an audible introduction with the voicemail message (step 350). If user 315 does not wish to associate an audible introduction with the voicemail message, decision 350 branches to "No" branch 352 bypassing message storage steps. In one embodiment, processing may proceed through existing art voicemail decision steps, such as deleting the voicemail, storing the voicemail without an audible introduction, or forwarding the voicemail to a colleague.

Figure 4:
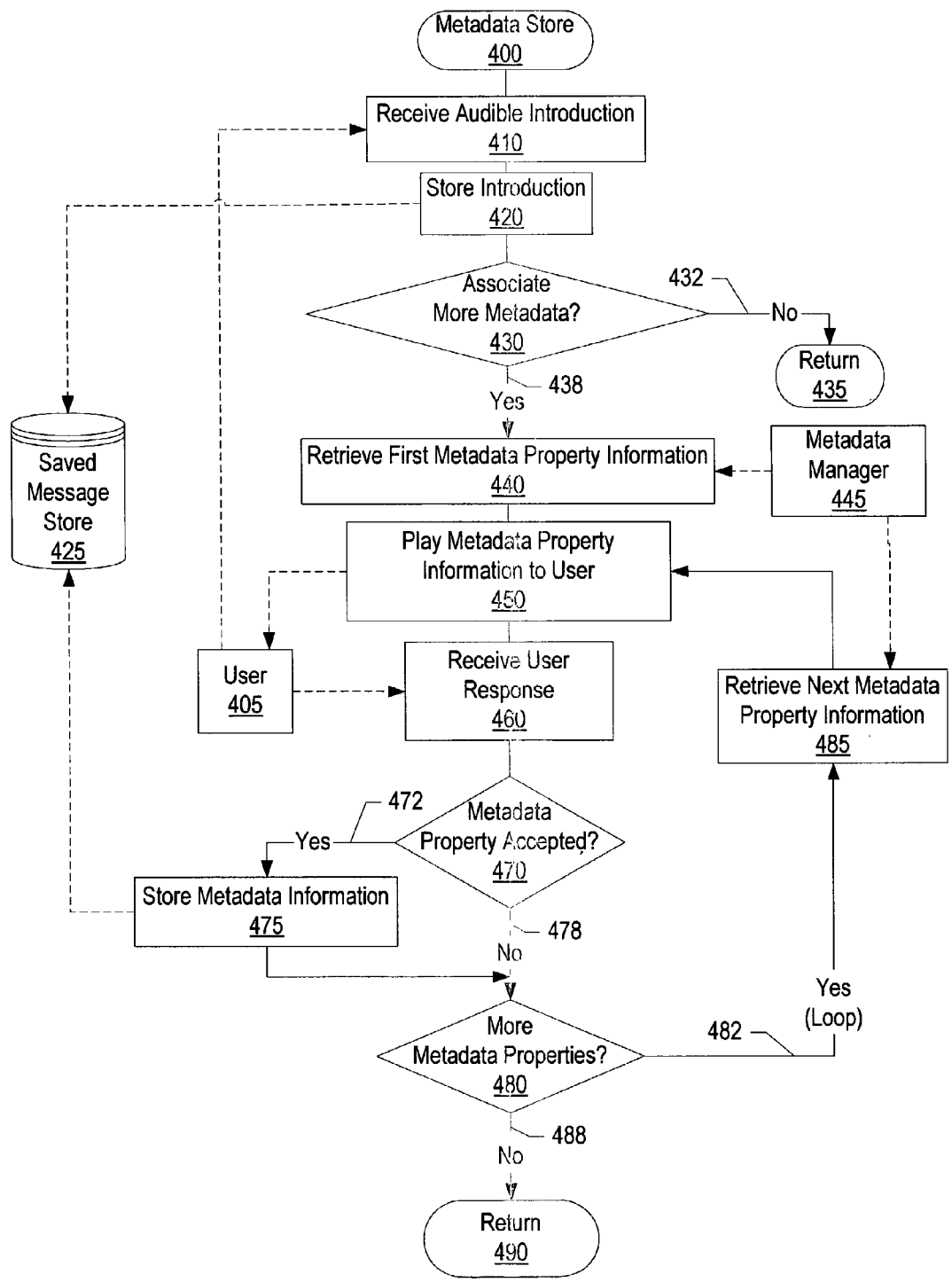
FIG. 4 is a flowchart showing steps taken in associating metadata to a voicemail message.

On the other hand, if user 315 wishes to associate an audible introduction with the voicemail message, decision 350 branches to "Yes" branch 358 whereupon the voicemail message is processed (pre-defined process block 360, see FIG. 4 and corresponding text for further details). In one embodiment, user 315 may wish to change an existing audible introduction in which decision 350 branches to "Yes" branch 358. Audible introductions and corresponding voicemails are stored in saved message store 365. Saved message store 365 may be stored on a non-volatile storage area, such as a computer hard drive.

A determination is made as to whether more messages exist in message store 325 for user 315 to review (decision 370). If there are more messages for user 315 to review, decision 370 branches to "Yes" 372 which loops back to retrieve (step 380) and process the next message. This looping continues until there are no more message for user 315 to review, at which point decision 370 branches to "No" branch 378. Processing ends at 390.

FIG. 4 is a flowchart showing steps taken in associating metadata to a voicemail message. Metadata store processing commences at 400, whereupon processing receives an audible introduction from user 405 (step 405). The audible introduction may include summary information corresponding to the associated voicemail message. For example, the voicemail message may be lengthy and user 405 may wish to include pertinent information from the voicemail message in the audible introduction so user 405 may access the audible introduction in the future and obtain the pertinent information without listening to the corresponding lengthy voicemail message. The audible introduction is stored in saved message store 425 at step 420. Saved message store 425 may be stored on a non-volatile storage area, such as a computer hard drive.

A determination is made as to whether user 405 wishes to associate more metadata to the voicemail message, such as a description data flag, a reminder flag, and a retention flag (decision 430). The description data flag may be used to index the voicemail message. For example, the description data flag may be used to group together voicemail messages that pertain to a particular project. The reminder flag may be used to notify user 405 to re-listen to the corresponding voicemail message at a particular time. For example, the voicemail message may include driving directions to a meeting in one week. User 405 may set a reminder flag to have the corresponding voicemail played one day before the meeting to remind the user of the driving directions. The retention flag may be used to instruct processing to delete a corresponding voicemail message and it's audible introduction at a future date. For example, user 405 may receive a message that includes information he may use within the next few days. In this example, user 405 may set a retention flag to have the voicemail deleted in two weeks in order to minimize the amount of saved messages he retains.

If user 405 does not wish to associate more metadata with the voicemail message, decision 430 branches to "No" branch 432 whereupon processing returns at 435. On the other hand, if user 405 wishes to associate more metadata with the voicemail message, decision 430 branches to "Yes" branch 438. Processing retrieves a first metadata property information from metadata manager 445 at step 440. Using the example described above, processing may retrieve description data flag identifiers that describe indexing options to associate the voicemail message. In this example, the description data flag identifiers may instruct user 405 to "press 1 to index the voicemail message in project A". Processing provides the metadata property information to user 405 at step 450. User 405 analyzes the metadata property information and determines whether to associate the metadata property information with the voicemail. Processing receives user 405's response at step 460.

A determination is made as to whether user 405 wishes to associate the metadata property information with the voicemail (decision 470). Using the example described above, user 405 may wish to associate the voicemail with project A and may have depressed the number "1" on his telephone. If user 405 wishes to associate the corresponding metadata with the voicemail, decision 470 branches to "Yes" branch 472 whereupon the metadata information is stored in saved message store 425 and associated with the corresponding voicemail message (step 475). In one embodiment, metadata information may be stored in a location separate from the voicemail message. Using the example described above, a description data flag of "1" may be stored in saved message store 425 and associated with the corresponding voicemail. On the other hand, if user 405 does not wish to associate the metadata information with the voicemail, decision 470 branches to "No" branch 478 bypassing metadata storage steps.

A determination is made as to whether there are more metadata property options to provide to user 405 (decision 480). Using the example described above, processing may have a reminder flag identifier to play for user 405. If processing has more metadata property options to provide to user 405, decision 480 branches to "Yes" branch 482 which loops back to retrieve (step 485) and process the next metadata property. On the other hand, if processing does not have more metadata properties to provide to user 405, decision 480 branches to "No" branch 488. Processing returns at 490.

Figure 5:
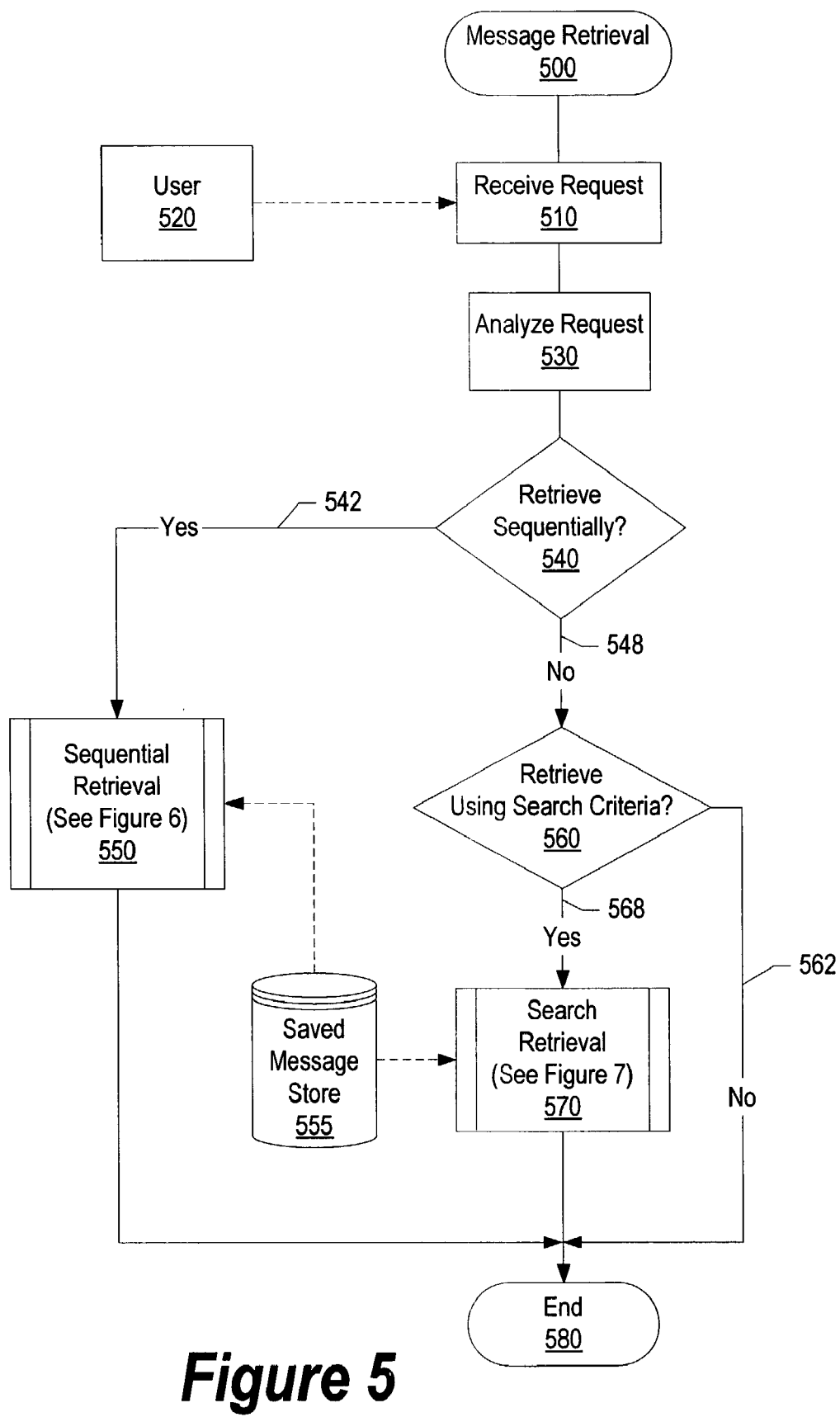
FIG. 5 is a high-level flowchart showing steps taken in retrieving an audible introduction associated with a saved voicemail message.

FIG. 5 is a high-level flowchart showing steps taken in retrieving an audible introduction associated with a saved voicemail message. Message retrieval processing commences at 500, whereupon a retrieval request is received from user 520 at step 510. For example, user 520 may have been on a business trip and may have associated audible introductions with multiple voicemails. Processing analyzes the request at step 530. In one embodiment, processing may provide user 520 with options for message retrieval. For example, user 520 may have associated retention flags with voicemail messages and the retention flags are expiring in which the associated voicemails will be deleted. In this example, processing may queue user 520 to review voicemail messages that have associated retention flags.

A determination is made as to whether user 520 wishes to review audible introductions sequentially (decision 540). For example, user 520 may not wish to search metadata but rather listen to audible introductions associated with voicemail messages in an order corresponding to when each audible introduction was saved. If user 520 wishes to listen to audible introductions in a sequential manner, decision 540 branches to "Yes" branch 542 whereupon audible introductions are retrieved from saved message store 555 (pre-defined process block 550, see FIG. 6 and corresponding text for further details regarding sequential retrieval). Saved message store 555 may be stored on a non-volatile storage area, such as a computer hard drive.

On the other hand, if user 520 does not wish to retrieve audible introductions sequentially, decision 540 branches to "No" branch 548 whereupon a determination is made as to whether user 520 wishes to retrieve audible introductions based upon a search criteria (decision 560). For example, the user may wish to listen to each audible introduction that relates to a particular project. If user 520 wishes to listen to audible introductions meeting a particular search criteria, decision 560 branches to "Yes" branch 568 whereupon audible introductions are retrieved from saved message store 555 (pre-defined process block 570, see FIG. 7 and corresponding text for further details).

On the other hand, if user 520 does not wish to retrieve audible introductions based upon particular search criteria, decision 560 branches to "No" branch 562 bypassing search retrieval steps. Processing ends at 580.

Figure 6:
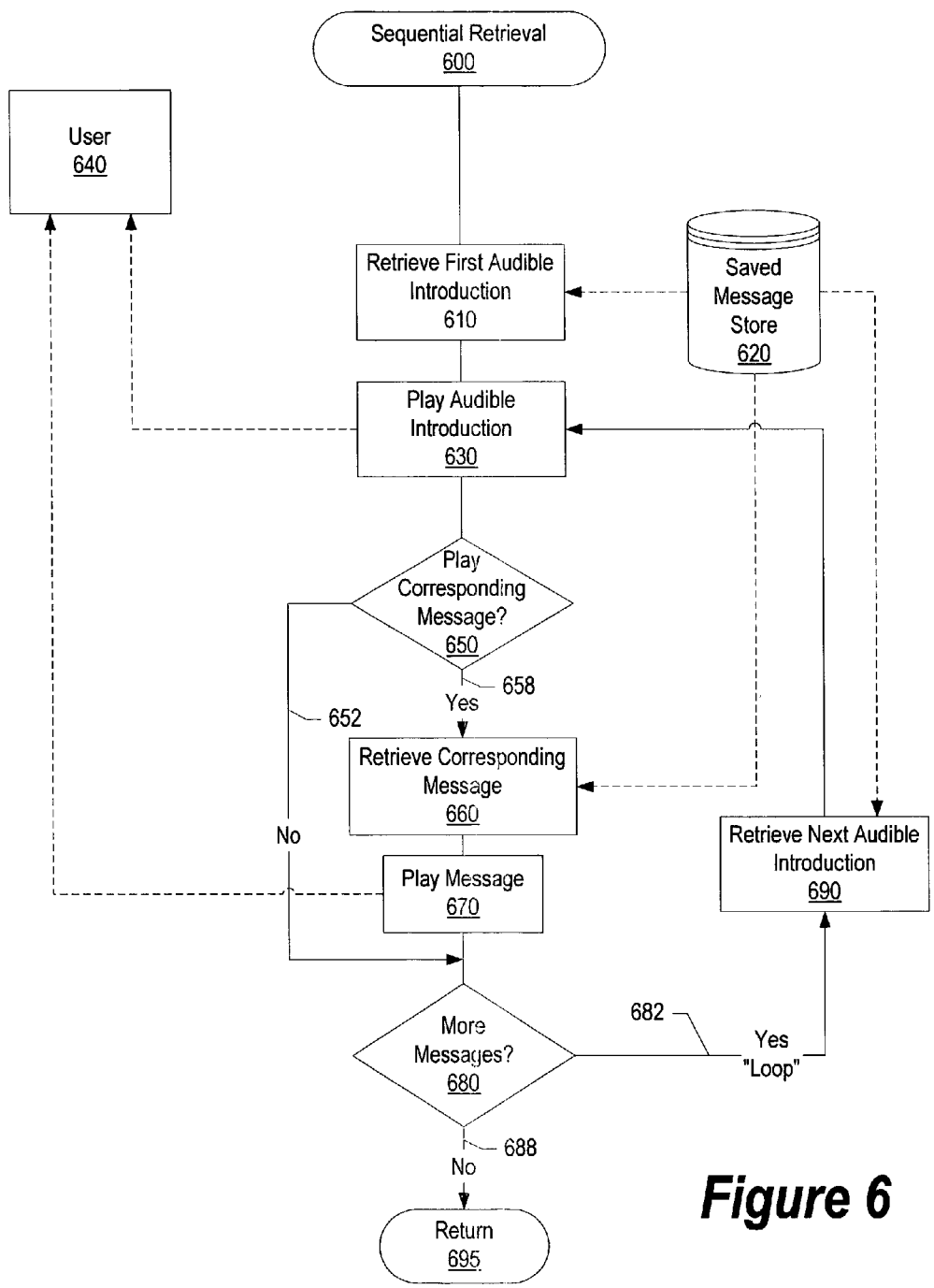
FIG. 6 is a flowchart showing steps taken in providing audible introductions to a user in a sequential manner and retrieving voicemail messages corresponding to the user's selection.

FIG. 6 is a flowchart showing steps taken in providing audible introductions to a user in a sequential manner and retrieving voicemail messages corresponding to the user's selection. For example, the user may wish to listen to audible introductions in an order relative to the time at which each corresponding voicemail message was received. Sequential retrieval processing commences at 600, whereupon processing retrieves a first audible introduction from saved message store 620 (step 610). Using the example described above, the user may be reviewing voicemail messages on Friday that he received during the week and the first audible introduction corresponds to a voicemail message that he received on Monday morning. Saved message store 620 may be stored on a non-volatile storage area, such as a computer hard drive.

Processing plays the audible introduction to user 640 at step 630. User 640 listens to the audible introduction and decides whether he wishes to hear the corresponding message. A determination is made as to whether user 640 wishes to play the voicemail message corresponding to the audible introduction (decision 650). Using the example described above, the first audible introduction may remind user 640 that the corresponding voicemail message includes information that he wishes to include in his weekly report. If user 640 wishes to listen to the corresponding voicemail message, decision 650 branches to "Yes" branch 658 whereupon the corresponding message is retrieved from saved message store 620 at step 660. Processing plays the voicemail message to user 640 at step 670. Using the example described above, processing plays the voicemail message that includes information that user 640 wishes to include in his weekly report. In one embodiment, user 640 may wish to associate metadata information to the corresponding voicemail message, such as a retention date flag, description data flag, or a reminder flag (see FIGS. 4, 8, and corresponding text for further details regarding metadata association).

On the other hand, if user 640 does not wish to listen to the corresponding voicemail message, decision 650 branches to "No" branch 652 bypassing voicemail retrieval steps. A determination is made as to whether there are more audible introductions corresponding to voicemail messages in saved message store 620 (decision 680). Using the example described above, saved message store 620 may include a second voicemail message that user 640 received on Tuesday in which user 640 previously recorded a corresponding audible introduction and saved it in saved message store 620. If there are more audible introductions corresponding to voicemail messages in saved message store 620, decision 680 branches to "Yes" branch 682 which loops back to retrieve (step 690) and process the next audible introduction. This looping continues until there are no more audible introductions, at which point decision 680 branches to "No" branch 688. Processing returns at 695.

Figure 7:
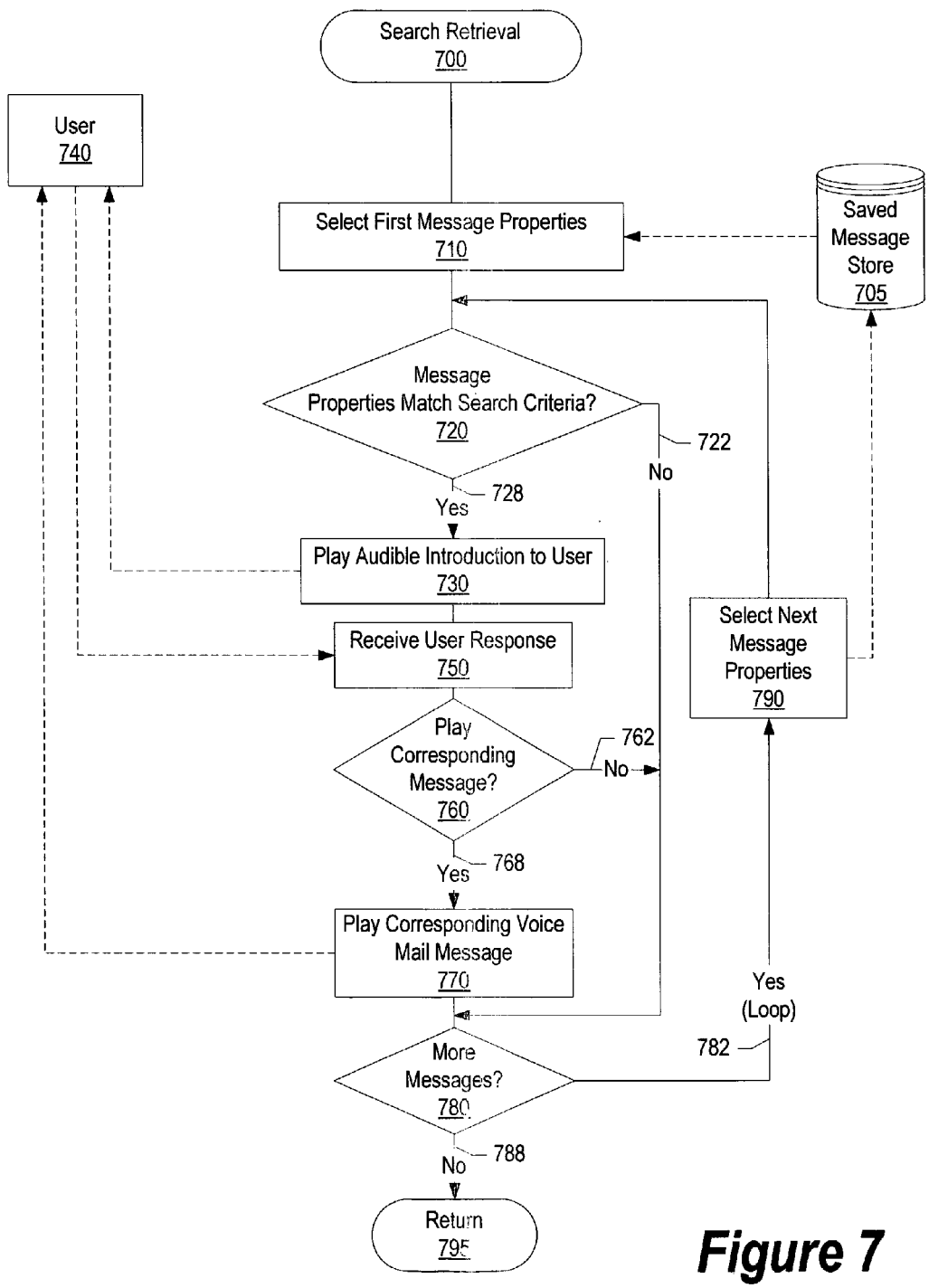
FIG. 7 is a flowchart showing steps taken in selecting audible introductions based on a user's metadata criteria and playing voicemails corresponding to the audible introductions.

FIG. 7 is a flowchart showing steps taken in selecting audible introductions based on a user's metadata criteria and playing voicemails corresponding to the audible introductions. Processing previously received a request from the user which included a metadata search criteria (see FIG. 5 and corresponding text for further details regarding user requests). For example, the user may wish to search for voicemail messages that include information regarding project "A". Search retrieval processing commences at 700, whereupon processing retrieves message properties corresponding to a first voicemail message from saved message store 705. Using the example described above, one of the message properties may be a description data flag that indexes the corresponding voicemail message into project groups.

A determination is made as to whether the message properties match the user's metadata search criteria (decision 720). Using the example described above, processing matches the message properties' description data flag with the user's project search criteria. If the message properties do not match the user's search criteria, decision 720 branches to "No" branch 722 bypassing audible introduction retrieval steps. On the other hand, if the message properties match the user's search criteria, decision 720 branches to "Yes" branch 728.

Processing plays the audible introduction associated with the voicemail message to user 740 at step 730. Using the example described above, processing plays the audible introduction associated with the voicemail message that includes project "A" information. User 740 listens to the audible introduction, and sends a response to processing regarding whether he wishes to listen to the corresponding voicemail messages. Processing receives user 740's response at step 750. A determination is made as to whether user 740 wishes to listen to the corresponding voicemail message (decision 760). If user 740 does not wish to listen to the corresponding voicemail message, decision 760 branches to "No" branch 762 bypassing voicemail playing steps. Using the example described above, the message properties may associate the voicemail message with project "A", but the audible introduction informed user 740 that the voicemail message included project "A" information that is not currently of interest to user 740.

On the other hand, if user 740 wishes to listen to the corresponding voicemail message, decision 760 branches to "Yes" branch 768 whereupon the corresponding voicemail message is played to user 740 (step 770). A determination is made as to whether there are more voicemail messages with associated metadata in saved message store 705 (decision 780). If there are more voicemail messages with associated metadata in saved message store 705, decision 780 branches to "Yes" branch 782 which loops back to select (step 790) and process the next voicemail metadata properties. This looping continues until there are no more voicemail messages with a associated metadata in saved message store 705, at which point decision 780 branches to "No" branch 788. Processing returns at 795.

Figure 8:
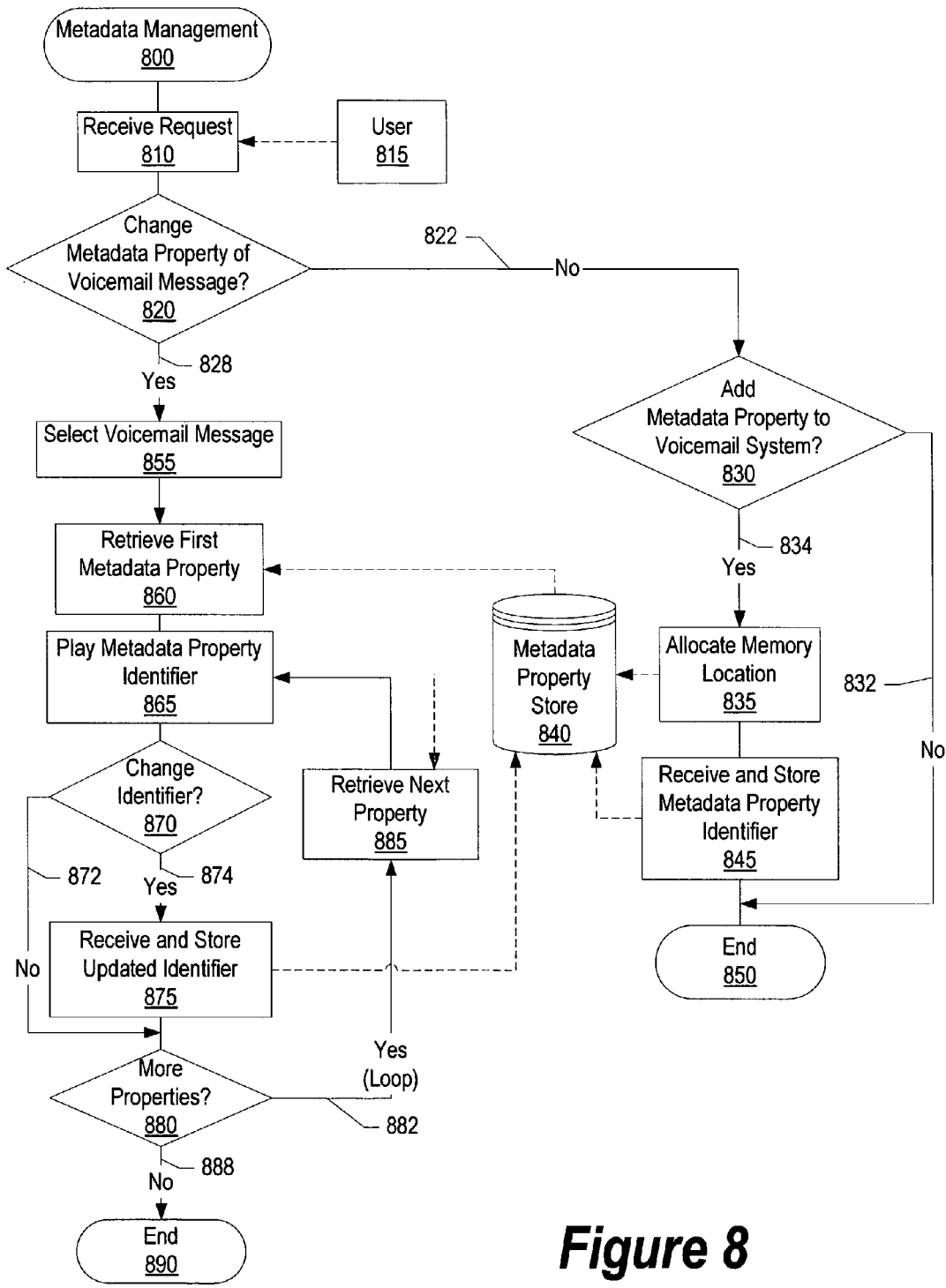
FIG. 8 is a flowchart showing steps taken in managing metadata properties.

FIG. 8 is a flowchart showing steps taken in managing metadata properties. Processing may include metadata other than an audible introduction associated with one or more voicemail messages which allows a user to organize voicemail messages using a description data flag, a reminder flag, and a retention flag. The description data flag may be used to index the voicemail message. For example, the description data flag may be used to group together voicemail messages that pertain to a particular project. The reminder flag may be used to notify the user to re-listen to the corresponding voicemail message. For example, the voicemail message may include driving directions to a meeting in one week. The user may set a reminder flag to have the corresponding voicemail played one day before the meeting to remind the user of the driving directions. The retention flag may be used to instruct processing to delete a corresponding voicemail message and it's audible introduction at a future date. For example, the user may receive a message that includes information he may use within the next few days. In this example, the user may set a retention flag to have the voicemail deleted in two weeks in order to minimize the amount of saved messages he retains.

Metadata management processing commences at 800, whereupon processing receives a request from user 815 at step 810. A determination is made as to whether the request pertains to changing metadata properties for a particular voicemail message. For example, user 815 may wish to extend for two weeks an expiration time of the retention flag associated with a voicemail message. If user 815 wishes to change metadata properties associated with a voicemail message, decision 820 branches to "Yes" branch 828 whereupon processing selects the voicemail message at step 855. Processing retrieves the associated metadata properties from metadata property store 840 at step 860. Metadata property store 840 may be stored on a non-volatile storage area, such as a computer hard drive.

A metadata property identifier is played to the user at step 865. The metadata property identifier identifies its corresponding metadata property. Using the example described above, the retention flag identifier may include information that describes the retention flag to the user, such as "the voicemail is scheduled for deletion in one week". A determination is made as to whether user 815 wishes to change the metadata property corresponding to the voicemail (decision 870). If user 815 wishes to change the metadata property, decision 870 branches to "No" branch 872 bypassing metadata property-changing steps. On the other hand, if user 815 wishes to change the metadata property, decision 870 branches to "Yes" branch 874.

Processing receives updated metadata information from user 815 and stores the updated metadata in metadata property store 840. Using the example above, user 815 may wish to have the corresponding voicemail message expire in three weeks, in which case processing receives a changed retention flag value. In this example, the retention flag value may be provided in a variety of formats, including a speech pattern from user 815 or DTMF tones using a touch-tone telephone.

A determination is made as to whether there are more metadata properties to retrieve from metadata property store 840 (decision 880). If there are more metadata properties to retrieve from metadata property store 840, decision 880 branches to "Yes" branch 882 which loops back to retrieve (step 885) and process the next metadata property. This looping continues until there are no more metadata properties to process, at which point decision 880 branches to "No" branch 888. Processing ends at 890.

If user 815's request does not pertain to changing metadata properties for a particular voicemail message, decision 820 branches to "No" branch 822 whereupon a determination is made as to whether the request pertains to adding a new metadata property to the voicemail system (decision 830). For example, user 815 may be starting a new project and wish to add a description data flag corresponding to the new project. If user 815's request does not pertain to adding a new metadata property to the voicemail system, decision 830 branches to "No" branch 832 bypassing metadata property addition steps.

On the other hand, if user 815 wishes to add a metadata property, decision 830 branches to "Yes" branch 834. Processing allocates memory in metadata property store 840 at step 835. In one embodiment, processing may not allocate memory but rather re-define an existing metadata property. In another embodiment, the user may wish to add a new property flag type. For example, user 815 may wish to add a priority flag which allows the user to set three priority levels for each message. Processing receives the metadata property information from user 815 and stores it in metadata property store 840 (step 845). Using the example described above, processing receives information pertaining to user 815's new project, such as "project B". Processing ends at 850.

Figure 9:
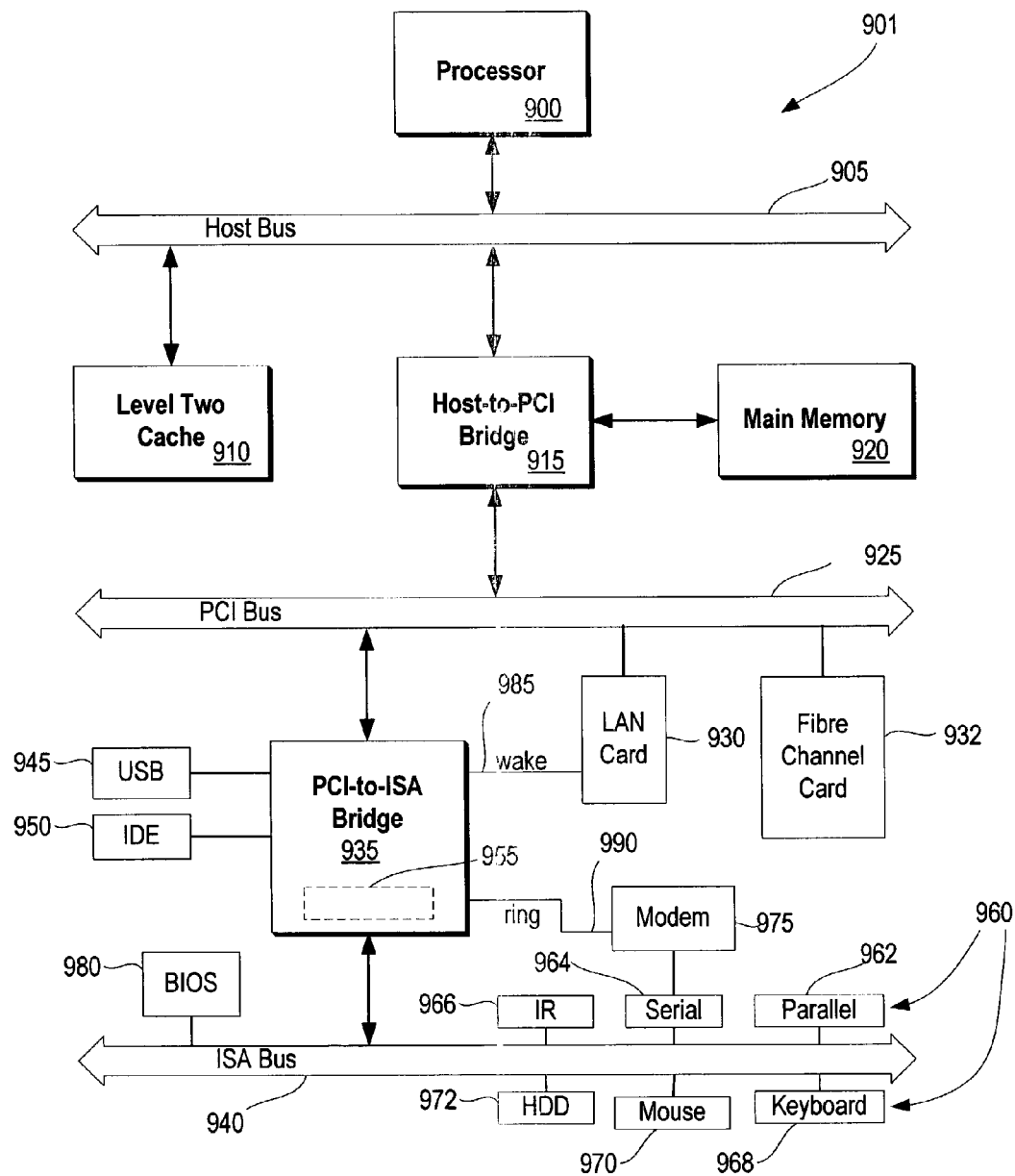
FIG. 9 is a block diagram of an information handling system capable of implementing the present invention.

FIG. 9 illustrates information handling system 901 which is a simplified example of a computer system capable of performing the invention described herein. Computer system 901 includes processor 900 which is coupled to host bus 905. A level two (L2) cache memory 910 is also coupled to the host bus 905. Host-to-PCI bridge 915 is coupled to main memory 920, includes cache memory and main memory control functions, and provides bus control to handle transfers among PCI bus 925, processor 900, L2 cache 910, main memory 920, and host bus 905. PCI bus 925 provides an interface for a variety of devices including, for example, LAN card 930. PCI-to-ISA bridge 935 provides bus control to handle transfers between PCI bus 925 and ISA bus 940, universal serial bus (USB) functionality 945, IDE device functionality 950, power management functionality 955, and can include other functional elements not shown, such as a real-time clock (RTC), DMA control, interrupt support, and system management bus support. Peripheral devices and input/output (I/O) devices can be attached to various interfaces 960 (e.g., parallel interface 962, serial interface 964, infrared (IR) interface 966, keyboard interface 968, mouse interface 970, and fixed disk (HDD) 972) coupled to ISA bus 940. Alternatively, many I/O devices can be accommodated by a super I/O controller (not shown) attached to ISA bus 940.

BIOS 980 is coupled to ISA bus 940, and incorporates the necessary processor executable code for a variety of low-level system functions and system boot functions. BIOS 980 can be stored in any computer readable medium, including magnetic storage media, optical storage media, flash memory, random access memory, read only memory, and communications media conveying signals encoding the instructions (e.g., signals from a network). In order to attach computer system 901 to another computer system to copy files over a network, LAN card 930 is coupled to PCI bus 925 and to PCI-to-ISA bridge 935. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more"

or "at least one" and indefinite articles such as "a" or "an"; the same holds true for the use in the claims of definite articles.

What is claimed is:

1. A computer-implemented method for handling voice mail messages, said method comprising:
   receiving, at a voicemail manager system, a message retrieval request from a user, the message retrieval request corresponding to a voice mail message generated by a caller;
   retrieving, by the voicemail manager system, the voice mail message in response to the receiving;
   playing at least a portion of the voice mail message to the user;
   playing a description data flag identifier to the user, wherein the description data flag identifier describes an indexing option to associate to the voicemail message;
   receiving, at the voicemail manager system, metadata generated by the user corresponding to the voice mail message wherein the metadata includes an audible introduction and a description data flag, the audible introduction generated by the user regarding the corresponding voice mail message and the description data flag corresponding to the description data flag identifier and used to index the voicemail message;
   associating, by the voicemail manager system, the metadata with the voice mail message; and
   storing, by the voicemail manager system, the associated metadata in a non-volatile storage area.

2. The computer-implemented method as described in claim 1 further comprising:
   receiving, at the voicemail manager system, a new description data request from the user wherein the new description data request includes a new description data flag identifier;
   creating, by the voicemail manager system, a new description data flag wherein the new description data flag corresponds to the new description data flag identifier; and
   storing, by the voicemail manager system, the new description data flag and the new description data flag identifier in the non-volatile storage area.

3. The computer-implemented method as described in claim 1 wherein the metadata corresponds to a metadata format and wherein the metadata format is selected from the group consisting of a DTMF tone and a speech pattern.

4. An information handling system comprising:
   one or more processors;
   a memory accessible by the processors;
   one or more nonvolatile storage devices accessible by the processors; and
   a voicemail handling tool to handle voicemails, the voicemail handling tool including:
      means for receiving a message retrieval request from a user, the message retrieval request corresponding to a voice mail message generated by a caller;
      means for retrieving the voice mail message in response to the receiving;
      means for playing at least a portion of the voice mail message to the user;
      means for playing a description data flag identifier to the user, wherein the description data flag identifier describes an indexing option to associate to the voicemail message;
      means for receiving metadata generated by the user corresponding to the voice mail message wherein the metadata includes an audible introduction and a description data flag, the audible introduction generated by the user regarding the corresponding voice mail message and the description data flag corresponding to the description data flag identifier and used to index the voicemail message;
      means for associating the metadata with the voice mail message; and
      means for storing the associated metadata in a non-volatile storage area.

5. The information handling system as described in claim 4 further comprising:
   means for receiving a new description data request from the user wherein the new description data request includes a new description data flag identifier;
   means for creating a new description data flag wherein the new description data flag corresponds to the new description data flag identifier; and
   means for storing the new description data flag and the new description data flag identifier in the non-volatile storage area.

6. The information handling system as described in claim 4 wherein the metadata corresponds to a metadata format and wherein the metadata format is selected from the group consisting of a DTMF tone and a speech pattern.

7. A computer program product stored on a computer operable media for handling voicemail messages, said computer program product comprising:
   means for receiving a message retrieval request from a user, the message retrieval request corresponding to a voice mail message generated by a caller;
   means for retrieving the voice mail message in response to the receiving;
   means for playing at least a portion of the voice mail message to the user;
   means for playing a description data flag identifier to the user, wherein the description data flag identifier describes an indexing option to associate to the voicemail message;
   means for receiving metadata generated by the user corresponding to the voice mail message wherein the metadata includes an audible introduction and a description data flag, the audible introduction generated by the user regarding the corresponding voice mail message and the description data flag corresponding to the description data flag identifier and used to index the voicemail message;
   means for associating the metadata with the voice mail message; and
   means for storing the associated metadata in a non-volatile storage area.

8. The computer program product as described in claim 7 further comprising:
   means for receiving a new description data request from the user wherein the new description data request includes a new description data flag identifier;
   means for creating a new description data flag wherein the new description data flag corresponds to the new description data flag identifier; and
   means for storing the new description data flag and the new description data flag identifier in the non-volatile storage area.

9. The computer program product as described in claim 7 wherein the metadata corresponds to a metadata format and wherein the metadata format is selected from the group consisting of a DTMF tone and a speech pattern.

* * * * *